United States Patent [19]

Sutton et al.

[11] Patent Number: 4,718,827

[45] Date of Patent: Jan. 12, 1988

[54] FUEL PUMP

[75] Inventors: Stephen J. Sutton, Fenton; John E. Creager, Linden; Richard F. Kostelic, Flint, all of Mich.

[73] Assignee: General Motors Corporation, Detroit, Mich.

[21] Appl. No.: 882,687

[22] Filed: Jul. 7, 1986

[51] Int. Cl.[4] .......................... F04B 21/00; B23Q 3/18

[52] U.S. Cl. ................................ 417/244; 29/156.4 R; 29/464; 415/198.2; 417/360

[58] Field of Search .......................... 415/198.1, 198.2; 29/407, 464, 281.5, 156.4 R; 417/244, 360, 366, 423 S

[56] References Cited

U.S. PATENT DOCUMENTS 1,149,702 8/1915 Vail ....................................... 29/464

2,964,837 12/1960 Harris .............................. 29/464 X

*Primary Examiner*—Carlton R. Croyle

*Assistant Examiner*—Theodore Olds

*Attorney, Agent, or Firm*—Saul Schwartz

[57] ABSTRACT

An improvement in automotive fuel pump assemblies of the type including a tubular cylindrical housing, an electric motor in the housing and a pump in the housing driven by the armature of the motor. The pump includes a first pump body adjacent a flux ring of the motor, a second pump body between the first pump body and the end of the tubular housing, and an impeller in a cavity between the pump bodies. The improvement resides in the provision of axially extending grooves in outer cylindrical surfaces of the pump bodies which register in only a single predetermined angular positional relationship of the pump bodies and in the provision of spring clips which fit in the registered grooves to maintain the predetermined positional relationship and to unitize the pump bodies for efficient handling prior to insertion in the tubular housing.

3 Claims, 2 Drawing Figures

FUEL PUMP

FIELD OF THE INVENTION

This invention relates generally to automotive type fuel systems and, more particularly, to submerged fuel pumps for such systems.

DESCRIPTION OF THE PRIOR ART

U.S. Pat. No. 4,209,284, issued to Lochmann et al on June 24, 1980 and assigned to the assignee of this invention, describes a two-stage fuel pump assembly for automotive fuel system applications wherein an electric motor and two pumping stages are disposed in a single housing located within the fuel tank of the vehicle and submerged in fuel during normal operation. The pumps consist of three pump sections or bodies stacked against each other at one end of the housing and a pair of open vane pump impellers disposed in appropriate cavities in the pump bodies. A shaft portion of the electric motor drives both impellers and causes fuel to be pumped from an inlet in the end one of the pump bodies, through annular pumping chambers defined around the periphery of each of the impellers, and out at a higher pressure into the interior of the pump housing through a discharge in the innermost one of the pump bodies. The fuel flows through the motor and out of the housing at an appropriate connection to the fuel system of the vehicle. Within the housing, the pump bodies are captured axially between an inturned flange at one end of the housing and an edge of cylindrical flux ring portion of the motor. Axially extending tabs on the pump bodies engage mating notches in the adjacent ones of the pump bodies and in the flux ring to positively establish the relative angular positions of the pump bodies and to react motor torque. The tabs complicate finishing operations on the corresponding end surfaces of the pump bodies because they form obstructions on the surfaces which must be avoided during surface finishing operations. Where the end surfaces are lapped and the dimensional tolerances on the pump bodies in the axial direction are relatively close, the complications created by the presence of such tabs are important considerations. In a pump according to this invention, the finished end surfaces of the pump bodies are unobstructed to promote economical manufacture and the pump bodies are positionally related by a simple and economical arrangement which simultaneously locates the pump bodies in predetermined angular relationships, holds the pump bodies together during handling prior to final assembly in the pump housing, and locates the pump bodies relative to other pump structure or to the motor flux ring during final assembly.

BRIEF SUMMARY OF THE INVENTION

This invention is a new and improved pump, particularly for submerged fuel pump applications, including a pair of pump bodies abutting at unobstructed, lapped end surfaces and defining therebetween a cavity for reception of a pump impeller and an annular pumping chamber around the impeller. Each of the pump bodies of the new and improved pump has a pair of axial grooves in an outer cylindrical surface thereof which grooves in one pump body register with the grooves in the other pump body only in a predetermined angular positional relationship between the pump bodies. A pair of keying members, separate from the pump bodies, are received in the registered pairs of grooves in the pump bodies and operate to maintain the predetermined positional relationship between the pump bodies and extend axially beyond the ends of the pump bodies to positively locate the pump relative to other structure and to react torque. In a preferred embodiment of the pump according to this invention, the keying members are spring clips which have flat, axially extending body portions disposed in the grooves in the pump bodies and rolled-over ends which extend beyond the wrap around the ends of the pump bodies, the body portions of the spring clips preventing relative angular displacement between the pump bodies and the rolled-over ends clamping and retaining the pump bodies together for efficient handling prior to final assembly. Also in the preferred embodiment of the pump according to this invention, the rolled-over ends of the spring clips mate with appropriately spaced notches on adjoining structure, such as the motor flux ring, to non-rotatably connect the pump to the adjoining structure and to react torque.

Figure 1:
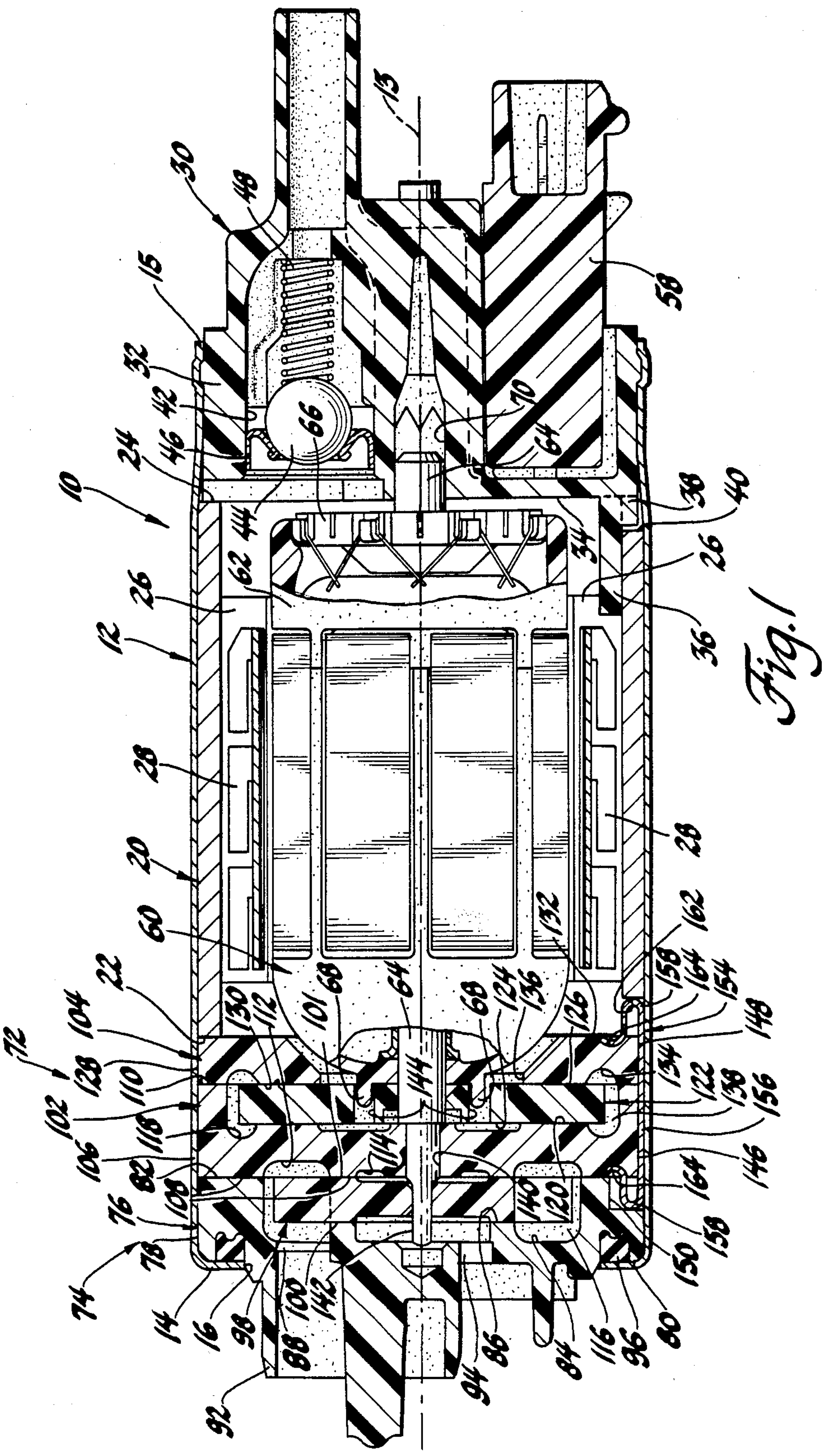
FIG. 1 is a longitudinal sectional view of an automotive fuel pump assembly including a pump according to this invention.

Referring now to the drawings, an automotive fuel pump assembly 10, illustrated in a generally horizontal attitude corresponding to installation in a fuel tank of a vehicle wherein the pump assembly is normally submerged in fuel, includes a tubular cylindrical housing 12 having a longitudinal axis 13. The housing 12 has an inturned annular flange 14 at one end, a circular edge 15 at the other end, and a circular aperture 16 defined by the inturned flange.

An electric motor of the pump assembly is disposed in the housing 12 and includes the cylindrical flux ring 20 closely received in the housing. The flux ring 20 has a first circular ege 22 and a second circular edge 24 at opposite ends. A pair of annular segmented magnets 26 are held on the flux ring 20 by a pair of spring clips 28.

A discharge end housing 30 of the pump assembly has a cylindrical body portion 32 which terminates in a generally circular inboard surface 34. The diameter of the body portion 32 corresponds generally to the inside diameter of the housing 12. A plurality of tabs 36 extend from the inboard surface 34 and are offset radially inward by an amount corresponding to the radial thickness of the flux ring 20. The discharge end housing 30 is received in the end of housing 12 opposite the flange 14 and seats against the edge 24 of the flux ring. A depending key portions 38 of the discharge end housing 30 seats in a notch 40 in the edge 24 of the flux ring to non-rotatably connect the end housing to the flux ring. The housing 12 is rolled or otherwise deformed around the end housing 30 to retain the latter on the housing 12. A discharge passage 42 extends through the discharge end housing 30 from the inboard surface 34 to the end of a tubular extension of the end housing. A check ball 44 in the discharge passage 42 is biased against a valve seat insert 46 by a spring 48. The check ball permits discharge flow of fuel through the passage 42 but seats against the valve seat insert 46 to prevent backflow in the opposite direction.

A pair of motor brushes 50 are received in appropriate axial bores 52 in the end housing 30 and project beyond the inboard surface 34. Respective ones of a pair of springs 54 seat against the brushes and against corresponding ones of a pair of terminals 56 pressed into the bores 52 from the opposite ends. An RF suppression module 58 is mounted on the end housing 30 and connected to the brushes 50.

The electric motor further includes an armature 60 having a winding portion 62, a shaft portion 64 to which the winding portion is secured, a commutator 66, and a pair of driving tangs 68. A commutator end of the shaft portion 64 is rotatably journaled in a bore 70 in the discharge end housing 30 centered on the axis 13 and the brushes 50 slidingly engage the commutator 66. The motor drives a high pressure pump 72 according to this invention and a low pressure pump 74.

The low pressure pump is generally conventional and includes an inlet section or body 76 having an outer cylindrical surface 78 corresponding in diameter to the inside diameter of the housing 12, a circular end surface 80, and an opposite end surface 82. A generally circular cavity 84 is formed in the end surface 82 and an integral portion of the inlet body defines an annular surface 86 raised above the bottom of the cavity. Both the cavity 84 and the annular surface 86 are centered on the axis 13. An inlet port 88 in the inlet body 76 opens into the bottom of the cavity 84 radially outboard of the annular surface 86 and into an extension 92 of the inlet body 76 around the inlet port to which a screen, not shown, is conveniently attached. A vapor discharge port 94 in the inlet body intersects the bottom of cavity 84 radially inboard of the annular surface 86. An O-ring type seal 96 disposed in a groove in the end surface 80 of the inlet body 76 bears against the inturned flange 14 on the housing 12 and defines a seal between the housing and the inlet body. A first impeller 98 is received wholly within the circular cavity 84 with an annular side surface 100 juxtaposed the annular surface 86 on the inlet body and cooperating therewith in defining a relatively loose seal between the surface 100 on the impeller and the inlet body. The impeller 98 has an annular surface 101 on the opposite side thereof corresponding to annular surface 100.

The high pressure pump 72 according to this invention is disposed within the housing 12 between the end surface 82 of the pump inlet body and the edge 22 of the flux ring. The high pressure pump 72 includes a first generally cylindrical pump section or body 102 and a second generally cylindrical pump section or body 104.

Figure 2:
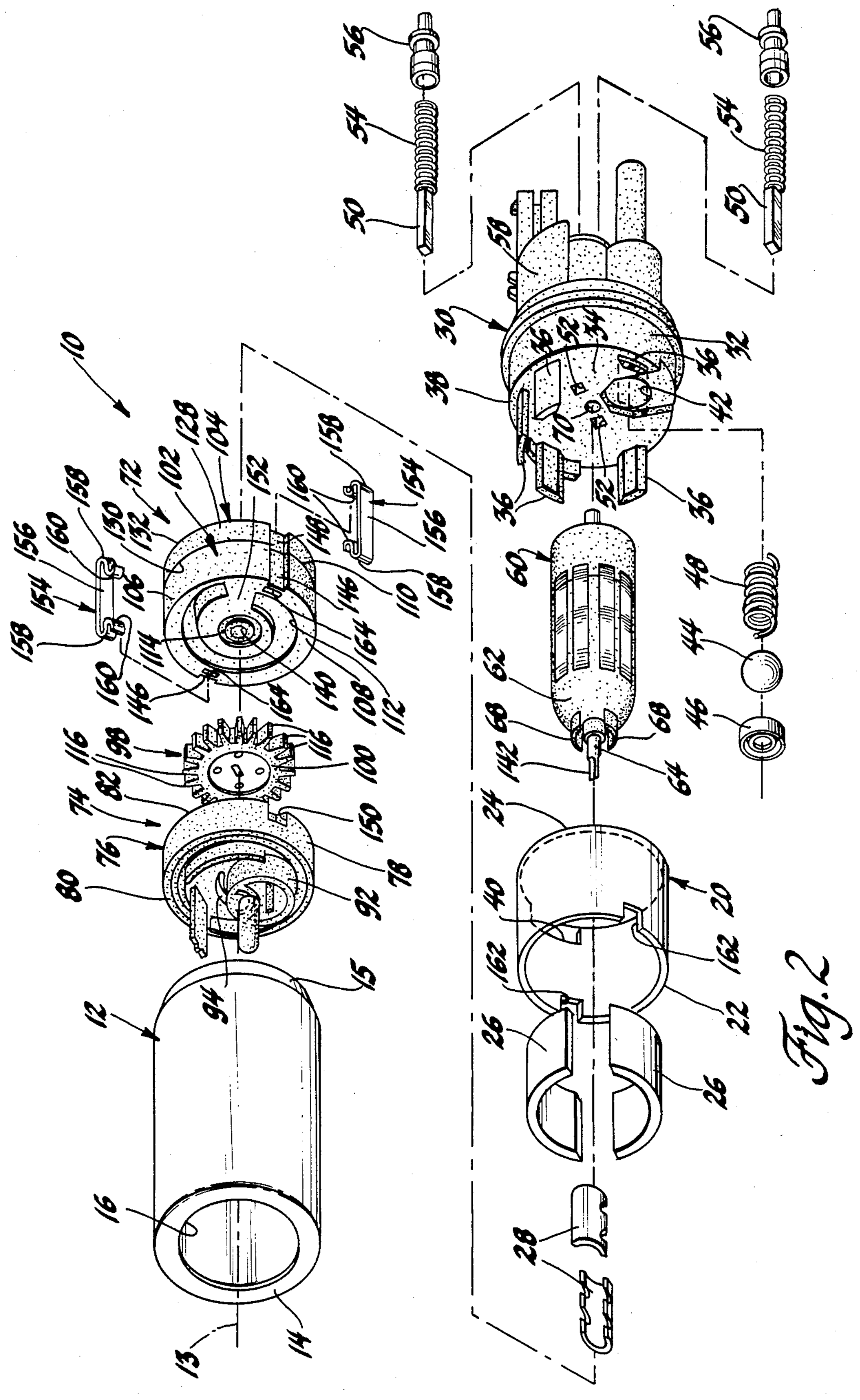
FIG. 2 is an exploded perspective view of the pump assembly shown in FIG. 1.

The first pump body 102 includes an outside cylindrical surface 106 having a diameter corresponding to the inside diameter of the housing 12, a first circular end surface 108 and a second circular end surface 110. The end surface 108 on the first pump body 102 abuts the end surface 82 on the inlet body 76 and has a partially spiral/partially circular groove 112 therein and a shallow counter-bore 114 inboard of the groove, FIG. 2, centered on the axis 13. The end surface 108 closes the circular cavity 84 in the inlet body and the groove 112 cooperates with the portion of the cavity radially outboard of annular surface 86 in defining an annular pumping chamber 116 around the first impeller 98. The annular surface 101 on the impeller is located opposite the portion of end surface 108 between the groove 112 and the counter-bore 114 and cooperates with the latter in defining a relatively loose seal between the impeller and the first pump body 102.

As seen best in FIG. 1, the end surface 110 of the first pump body 102 has a circular cavity 118 therein centered on the axis 13. A raised portion of the first pump body defines an annular surface 120 raised from the bottom of the cavity and also centered on the axis 13. A second pump impeller 122 is disposed within the circular cavity 118 and has a first circular side surface 124 juxtaposed the annular surface 120 and an opposite second circular side surface 126 in the plane of the end surface 110 of the pump body 102.

The second pump body 104 includes an outside cylindrical surface 128 having a diameter equal to the diameter of the outside cylindrical surface 106 of the first pump body 102, a first circular end surface 130, and a second circular end surface 132. The end surface 130 on the second pump body abuts the end surface 110 on the first pump body and has a shallow, generally circular groove 134 therein. A bore 136 through the pump body 104, radially inboard of the groove 134 and centered on the axis 13, is chamfered at its intersection with the end surface 132. The end surface 130 closes the circular cavity 118 in the first pump body and the groove 134 cooperates with the portion of the cavity radially outboard of annular surface 120 in defining an annular high pressure pumping chamber 138 around the second impeller 122. The annular surface 120 cooperates with the first circular side surface 124 on the second impeller and the end surface 130 on the second body 104 cooperates with the second circular side surface 126 on the impeller in defining high pressure seals at the radially inboard extremity of the pumping chamber 138.

As seen best in FIG. 1, a pump end of the armature shaft portion 64 projects through the high pressure pump 72 and the low pressure pump 74 and is rotatably journaled in a bore 140 in the first pump body 102 centered on the axis 13. The first impeller 98 is drivingly connected to the armature shaft portion at a milled flat 142 on the latter. The drive tangs 68 project through the bore 136 in the second pump body and engage a pair of slots 144 in the second impeller 122 whereby the second impeller is also drivingly connected to the motor armature.

The first pump body 102 has a pair of axial grooves 146 in outer cylindrical surface 106 thereof which are non-symmetrically spaced around the circumference of the first pump body. The second pump body 104 has a corresponding pair of axial grooves 148 in the outer cylindrical surface 128 thereof which are identically non-symmetrically spaced around the circumference of the second pump body and thus register with the grooves 146 in only one angular positional relationship between the first and second pump bodies.

The one angular positional relationship in which the grooves 146 and 148 register is predetermined to assure that stripper walls, not shown, on the first and second pump bodies 102 and 104 separate inlet and discharge ports, not shown, of the high pressure pumping chamber 138. The discharge port conveys fuel from the pumping chamber 138 to the interior of the housing 12 around the armature 60. The inlet port conveys fuel from a discharge port, not shown, of the low pressure pumping chamber 116 to the high pressure pumping chamber.

The pump inlet body 76 has a pair of notches 150 which intersect both the end surface 82 and the outer cylindrical surface 78 of the inlet body. The notches 150 are spaced around the cylindrical surface 78 so as to register with the grooves 146 in the first pump body in only one angular positional relationship between the inlet body 76 and the first pump body 102. The one angular positional relationship in which the notches 150 register with the grooves 146 is predetermined to assure that a stripper wall, not shown, on the inlet pump body and a stripper wall 152, FIG. 2, on the first pump body separate the inlet port 88 to the low pressure pumping chamber from the discharge port thereof, not shown.

A pair of spring clip keying members 154 each include a flat, elongated body portion 156 and a pair of rolled-over ends 158 at opposite ends of the body portion. Each rolled-over end 158 doubles back and forms an inwardly facing foot 160 on the keying member. The body portions 156 of the clips are received in the registered pairs of grooves 146 and 148 wholly inboard of the outside cylindrical surfaces 106 and 128 of the first and second pump bodies. The rolled-over ends 158 of the clips project across the interface defined at the abutting end surfaces 82 and 108 and into the notches 150. At the opposite ends of the clips, the rolled-over ends project beyond the end surface 132 and into a pair of appropriately spaced notches 162 in the edge 22 of the flux ring. The inwardly facing feet 160 on the rolled-over ends resiliently engage corresponding ones of the end surfaces 108 and 132 in a plurality of keeper dimples 164 in the end surfaces inboard of the grooves 146, 148 and press the first and second pump bodies together.

The low pressure pump 74 functions as a vapor separating unit and provides a continuous supply of the vapor-free fuel to the inlet port of the high pressure pumping chamber 138. When the impeller 98 is rotated by the armature shaft portion 64, fuel and vapor mixture is drawn into the pumping chamber 116 through inlet port 88. The less dense vapors migrate radially inward through the loose seals defined on opposite sides of the impeller. The vapors are forced out the vapor discharge slot 94 and the liquid fuel is delivered to the inlet port of the high pressure pumping chamber 138. In the high pressure pumping chamber the pressure of the fuel is raised to the level required by the fuel injection system of the vehicle.

The raised annular surface 120 on the first pump body, the end surface 130 on the second pump body 104, and the side surfaces 124 and 126 on the second impeller 122 are highly finished, as by lapping, and the depth of the circular cavity 118 between the end surface 110 and the raised surface 120 is closely controlled so that a pressure seal is defined at the radially inboard extremity of the high pressure pumping chamber. To facilitate the surface finishing operations, the impeller 122 and the first and second pump bodies 102 and 104 are molded separately from appropriate plastic material without any structural features projecting across the planes of the end surfaces 108, 110, 130, and 132, and the plane of raised annular surface 120, and the planes of the side surfaces 124 and 126. Thus, the finishing tool is permitted to make a clean pass over the surfaces without having to be programmed to avoid obstructions.

Following the machining operations on the impeller 122 and the first and second pump bodies 102 and 104, the impeller is positioned in the circular cavity 118 and the first and second pump bodies are mated in their proper angular positional relationship. The clips 154 are then installed on the pump bodies and operate to simultaneously unitize or hold the pump bodies together during subsequent handling and to prevent relative angular displacement between the pump bodies.

In the final assembly sequence for the pump assembly, the inlet body 76 is inserted first into the housing 12 and seats against the flange 14. Next, the first impeller 98 is installed in the circular cavity 84 and the high pressure pump 72 is inserted in the housing. The high pressure pump is rotated until the rolled-over ends 158 of the clips 154 achieve registry with the notches 150 in the inlet body whereupon the end surface 108 seats against the end surface 82 and the high pressure pump is non-rotatably secured to the inlet body. The flux ring 20 is then inserted in the housing and rotated until the notices 162 in the edge 22 thereof register with the opposite rolled-over ends 158 of the clips 154 whereupon the high pressure pump is non-rotatably connected to the flux ring. Finally, the motor armature is installed and the discharge end body is inserted in the housing and secured to the latter through deformation of the housing around the end body.

The embodiments of the invention in which an exclusive property or privilege is claimed are defined as follows:

1. In a submerged fuel pump assembly having
a tubular cylindrical housing defining a longitudinal axis of said pump assembly,
an electric motor including a cylindrical flux ring disposed within said housing and an armature rotatable within said flux ring about said longitudinal axis, and
a pump within said tubular housing including a first cylindrical pump body having a first end surface abutting an edge of said flux ring and a second cylindrical pump body disposed between an end of said tubular housing and said first pump body having a second end surface on the opposite side of said pump from said first end surface and an impeller rotatable in a cavity defined between said first and said second pump bodies,
said impeller being drivingly connected to said armature,
the improvement comprising:
means on said first pump body defining a pair of first axially extending grooves in an outer cylindrical surface thereof extending across the full length of and non-symmetrically angular spaced around said outer cylindrical surface,
means on said second pump defining a pair of second axially extending grooves in an outer cylindrical surface thereof extending across the full length of and non-symmetrically angular spaced around said outer cylindrical surface,
the angular spacing between said pair of first grooves being equal to the angular spacing between said pair of second grooves so that said pair of first grooves registers with said pair of second grooves only in a single predetermined angular positional relationship between said first and said second pump bodies,
a pair of keying members extending between said first and said second pump bodies and disposed within said pairs of said first and said second grooves when said first and said second pump bodies are in said predetermined angular positional relationship so that relative angular displacement between said first and second pump bodies is prevented, and
means on each of said keying members operative to resiliently bias said first pump body against said second pump body and to retain said keying members in said pairs of said first and said second grooves prior to insertion of said pump in said housing so that said pump is unitized for efficient handling prior to insertion in said housing.

2. The improvement recited in claim 1 and further including means on each of said keying members defining an end portion projecting axially beyond said first end surface of said first pump body, and means in said flux ring defining a pair of notches in said edge thereof angularly spaced around said edge at distances corresponding to the angular spacing between said pairs of said first and said second grooves so that said notches receive respective ones of said keying member end portions thereby to non-rotatably connect said flux ring to said first and said second pump bodies.

3. The improvement recited in claim 2 wherein each of said keying members is a spring clip including a flat body portion disposed in said pairs of said first and said second grooves, a pair of rolled-over ends at opposite ends of said body portion extending axially beyond said first and said second end surfaces, and means on each of said rolled-over ends defining and inwardly facing foot resiliently biased against a respective one of said first and said second end surfaces.

* * * * *